United States Patent
Lee

(10) Patent No.: US 12,207,760 B2
(45) Date of Patent: Jan. 28, 2025

(54) TUNNEL-SHAPED CONTINUOUS BARBECUE APPARATUS

(71) Applicant: Innohas Co., Ltd., Seoul (KR)

(72) Inventor: Young Hee Lee, Seoul (KR)

(73) Assignee: INNOHAS CO., LTD. (KR)

( * ) Notice: Subject to any disclaimer, the term of this patent is extended or adjusted under 35 U.S.C. 154(b) by 448 days.

(21) Appl. No.: 17/830,693

(22) Filed: Jun. 2, 2022

(65) Prior Publication Data

US 2022/0386811 A1 Dec. 8, 2022

(30) Foreign Application Priority Data

Jun. 2, 2021 (KR) .................. 10-2021-0071487

(51) Int. Cl.
  *A47J 37/07* (2006.01)
  *A47J 37/04* (2006.01)
(52) U.S. Cl.
  CPC ........... *A47J 37/0713* (2013.01); *A47J 37/04* (2013.01); *A47J 37/0786* (2013.01)
(58) Field of Classification Search
  CPC ...... A47J 37/045; A47J 37/0713; A47J 37/04; A47J 37/0786
  See application file for complete search history.

(56) References Cited

U.S. PATENT DOCUMENTS

| | | | |
|---|---|---|---|
| 2015/0079259 A1* | 3/2015 | Ahmed | A21B 1/48 426/523 |
| 2019/0104883 A1* | 4/2019 | Nelson | A47J 44/00 |
| 2021/0131667 A1* | 5/2021 | Adamski | F24C 1/04 |

FOREIGN PATENT DOCUMENTS

| | | |
|---|---|---|
| KR | 101368138 B1 | 2/2014 |
| KR | 101493896 B1 | 2/2015 |
| KR | 1020180125918 A | 11/2018 |
| KR | 102095872 B1 | 4/2020 |
| KR | 102113271 B1 | 5/2020 |

OTHER PUBLICATIONS

Korean Office Action (KR 10-2021-0071487), KIPO, Sep. 25, 2021.
Korean Notice of Allowance (KR 10-2021-0071487), KIPO, Dec. 27, 2022.

* cited by examiner

*Primary Examiner* — Alfred Basichas
(74) *Attorney, Agent, or Firm* — Park & Associates IP Law Office

(57) ABSTRACT

According to the present invention, there is provided a tunnel-shaped continuous barbecue apparatus including: more specifically, a main body having an opening portion at a center thereof; a conveyance unit that rotates and moves a barbecue unit, in which meat is put, with external power from one side to the other side of the main body and is formed at both ends of the opening portion of the main body in a length direction of the main body; heating units that are formed at regular intervals at a lower part on one side of the main body and heat the meat in the barbecue unit over direct fire through the opening portion of the main body; smoking units that are formed at regular intervals at the lower part on the other side of the main body and smoke and heat the meat by supplying smoke into the barbecue unit through the opening portion of the main body, the smoke being produced by burning a smoke material; and an exhaust unit that is provided above the main body and discharges smoke outside.

6 Claims, 7 Drawing Sheets

TUNNEL-SHAPED CONTINUOUS BARBECUE APPARATUS

REFERENCE TO RELATED APPLICATIONS

This application claims the priority benefit of Korean Patent Application No. 10-2021-0071487 filed on Jun. 2, 2021, the entire contents of which are incorporated herein by reference.

FIELD OF THE INVENTION

The present invention relates to a tunnel-shaped continuous barbecue apparatus, and more specifically to a tunnel-shaped continuous barbecue apparatus in which meat can be continuously cooked over direct gas fire and charcoal fire while passing through an inside of a tunnel.

BACKGROUND OF THE INVENTION

In general, meat can be cooked in various ways; however, one of the best ways of cooking meat most deliciously is barbecuing the meat using charcoal.

When meat is barbecued by a direct-fire barbecue method of burning charcoal to produce heat and directly putting the meat over the heat, meat oil is drained, and thus an oily taste is removed from the meat. In addition, the meat is flavored with charcoal smoke produced by burning charcoal in a process of barbecuing the meat by heat of the charcoal, and thus a unique taste and flavor is added to the meat.

This is why many restaurants increase menus of meat cooked with a charcoal barbecue apparatus.

Recently, as one-person households or two- or three-person households is rapidly increased, people who eat alone is increased, and a processing industry market for enabling a small amount of food to be purchased and be rapidly cooked tends to increase in size.

However, since meat has to be cooked manually by a lot of manpower in order to fulfil meat cooking through smoking and barbecuing, a lot of manpower has to be mobilized, and thus a problem of a reduction in productivity due to overspending for labor costs is pointed out.

In particular, problems arise in that it is not only inconvenient for one person to smoke and barbecue meat over charcoal fire alone at home but also uncomfortable to clean afterwards due to a lot of oil splashing while meat is barbecued at home.

In addition, when meat is barbecued using charcoal or a briquet, a worker has to control bisque firing processes one by one, and thus problems of low production and inconsistent quality arise when the barbecued meat is delivered to restaurants, processing companies, or homes.

Further, in order to cook meat over charcoal fire, gas fire, or the like, the meat is cooked on a barbecue grill or a roasting net while being turned over. In this manner, since flames generated from the charcoal fire are directly applied to the meat, the meat happens to be partially burned. Since ingestion of the burned meat can bring about a health problem, it is inconvenient in that meat has to be continually turned over in order to prevent the meat from being burned.

Consequently, there is a demand for an apparatus that can mass-produce meat cooked with heat and smoke over charcoal fire in a consistent quality so as to deliver the meat to many homes and restaurants.

CITATION LIST

Patent Literature

[Patent Literature 0001]
Korean Patent Publication No. 10-2113271.

SUMMARY OF THE INVENTION

Consequently, in order to solve the above-described problems, an object of the present invention is to provide a tunnel-shaped continuous barbecue apparatus that fulfils automatic cooking by a method of using direct gas fire and charcoal smoke when meat is loaded inside a tunnel of the apparatus.

In addition, another object thereof is to provide a tunnel-shaped continuous barbecue apparatus including a plurality of barbecue units that enable continuous cooking to be fulfilled for each zone while being continuously rotated and moved inside a tunnel.

In addition, still another object thereof is to provide a tunnel-shaped continuous barbecue apparatus that has a structure for barbecuing meat without burning so as to automatically barbecue meat without turning over one by one by a cook.

In addition, still another object thereof is to provide a tunnel-shaped continuous barbecue apparatus including a double-exhaust hood that enables smoke produced during meat cooking to be efficiently discharged.

In addition, still another object thereof is to provide a tunnel-shaped continuous barbecue apparatus that can detect a cooking temperature of the meat such that a meat conveying speed can be adjusted based on the detected temperature.

In addition, still another object thereof is to provide a tunnel-shaped continuous barbecue apparatus that has a direct gas fire zone and a charcoal fire cooking zone which are divided to appropriately fulfil cooking depending on types of meat.

According to an embodiment of the present invention, there is provided a tunnel-shaped continuous barbecue apparatus including: a main body having an opening portion at a center thereof; a conveyance unit that rotates and moves a barbecue unit, in which meat is put, with external power from one side to the other side of the main body and is formed at both ends of the opening portion of the main body in a length direction of the main body; heating units that are formed at regular intervals at a lower part on one side of the main body and heat the meat in the barbecue unit over direct fire through the opening portion of the main body; smoking units that are formed at regular intervals at the lower part on the other side of the main body and smoke and heat the meat by supplying smoke into the barbecue unit through the opening portion of the main body, the smoke being produced by burning a smoke material; and an exhaust unit that is provided above the main body and discharges smoke outside.

In addition, in the tunnel-shaped continuous barbecue apparatus, the conveyance unit may include: a conveyor which moves the barbecue unit on a straight line by a plurality of drive members formed at the lower part of the main body, is formed at both ends of the opening portion of the main body in the length direction of the main body, and loops on an endless track along a shape of the main body; and a rack member which is formed in parallel with the conveyor at both ends of the opening portion of the main body and rotates the barbecue unit in conjunction with looping of the conveyor.

In addition, in the tunnel-shaped continuous barbecue apparatus, the barbecue unit may include: a rotary gear which meshes with the rack member; a central shaft which is provided as a shaft to the rotary gear and has both ends seated on the conveyor; and a barbecue case which is fixed to the central shaft penetrating the barbecue case and contains meat inside.

In addition, in the tunnel-shaped continuous barbecue apparatus, the exhaust unit may have: a first ceiling member which is provided at both upper ends of the main body and forms a space through which the barbecue unit can pass; at least one first exhaust hood which is formed to penetrate the first ceiling member and discharges smoke passing through the opening portion of the main body from the heating units and the smoking units to the outside; a second ceiling member which forms an exhaust passage through which smoke leaking through side surfaces of the main body from the heating units and the smoking units passes by being fixed to the first exhaust hood in a state of being separated from the first ceiling member by a predetermined distance; and a plurality of second exhaust hoods which are formed to penetrate the second ceiling member at regular intervals, some of the second exhaust hoods being connected to the first exhaust hood and discharging smoke passing through the first exhaust hood to the outside, and the rest of the second exhaust hoods discharging smoke passing through the exhaust passage to the outside.

In addition, in the tunnel-shaped continuous barbecue apparatus, the main body may include, at sides, a plurality of side holes formed at regular intervals in the length direction of the main body and a panel unit which is detachable from the side holes.

In addition, in the tunnel-shaped continuous barbecue apparatus, the main body may have a temperature detecting sensor inside, the temperature detecting sensor detecting a temperature in the heating unit and the smoking unit, and a speed at which the conveyance unit conveys the barbecue unit and a temperature of the heating unit may be adjusted corresponding to the temperature detected by the temperature detecting sensor.

In addition, in the tunnel-shaped continuous barbecue apparatus, the main body may have a stationary unit at an end on one side of the main body, the stationary unit providing a place at which the barbecue unit stays before entering the conveyance unit.

A tunnel-shaped continuous barbecue apparatus according to the present invention is effective in that mass production can be fulfilled by cooking in a method of using direct gas fire and charcoal smoke while meat is automatically conveyed by a conveyor after meat is loaded inside a tunnel of the apparatus.

In addition, the tunnel-shaped continuous barbecue apparatus is effective in that continuous cooking can be fulfilled by heating and smoking the meat while a plurality of barbecue units are rotated and moved.

In addition, the tunnel-shaped continuous barbecue apparatus is effective in that meat is not burned by applying flame to the entire surface of meat, and thus the meat can be automatically barbecued without turning over one by one by a cook.

In addition, the tunnel-shaped continuous barbecue apparatus is effective in that a double-exhaust hood is provided to enable smoke produced during meat cooking to be efficiently discharged.

In addition, the tunnel-shaped continuous barbecue apparatus is effective in that a cooking temperature of the meat is detected such that a meat conveying speed can be adjusted based on the detected temperature.

In addition, the tunnel-shaped continuous barbecue apparatus is effective in that a direct gas fire zone and a charcoal fire cooking zone are formed so as to appropriately fulfil cooking depending on types of meat.

DETAILED DESCRIPTION OF THE INVENTION

Figure 1:
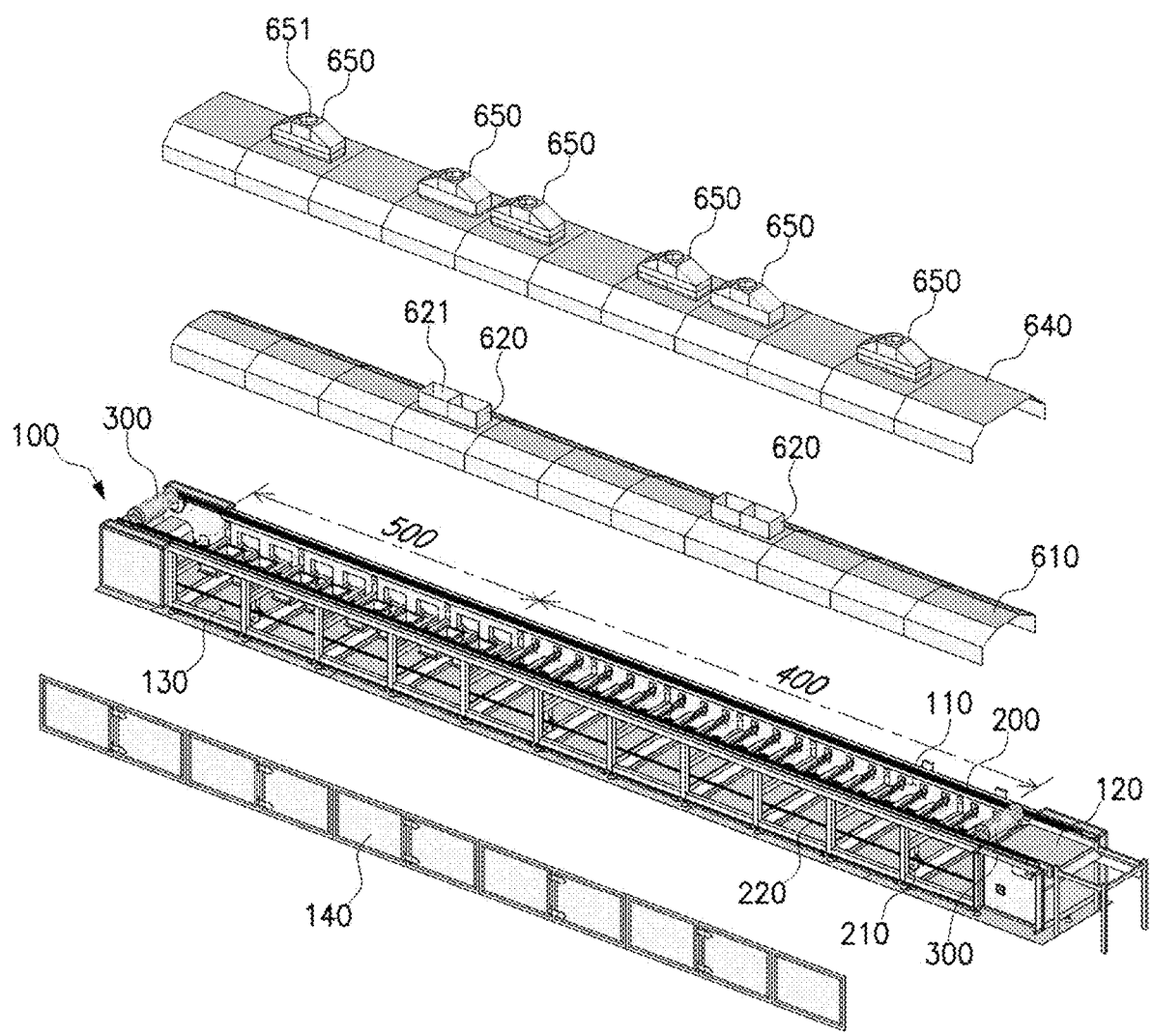
FIG. 1 is a perspective view of a tunnel-shaped continuous barbecue apparatus according to an embodiment of the present invention.

Hereinafter, an embodiment of the present invention will be described in detail with reference to the accompanying drawings. Meanwhile, in the descriptions of the drawings and the embodiment, the illustration and description of a configuration and an operation of which those skilled in the art can easily understand is briefly provided or omitted. In particular, in the drawings and description of the embodiment, the detailed description and illustration of a specific technical configuration and operation of an element which is not directly connected to a technical feature of the present invention is omitted, and only technical configurations related to the present invention are briefly illustrated or described.

Terms "front side", "rear side", "front surface", "back surface", "upper part", "lower part", "upper surface", "undersurface", or the like used in the following description is defined based on the drawings, and a shape and a position of each configuration is not limited by the terms.

FIG. 1 is a perspective view of a tunnel-shaped continuous barbecue apparatus according to an embodiment of the present invention.

With reference to FIG. 1, the tunnel-shaped continuous barbecue according to the embodiment of the present invention includes a main body 100, a conveyance unit 200, a barbecue unit 300, a heating unit 400, a smoking unit 500, and an exhaust unit 600.

The main body 100 has a structure configured of a plurality of frames and includes an opening portion 110 formed at a center of the main body, a stationary unit 120 formed at an end on one side of the main body, side holes 130 formed at sides at regular intervals in a length direction of the main body, and a panel unit 140 detachable from the side holes 130.

The opening portion 110 is a passage for applying heat to meat which is put into an inside of the barbecue unit 300 and can be formed to have a predetermined size in the length direction of the main body 100.

The stationary unit 120 provides a place at which the barbecue unit 300 stays before entering the conveyance unit 200, and the stationary unit can be formed into a "[" shape so as to settle the barbecue unit 300 thereon.

The side holes 130 are formed at sides at regular intervals in the length direction of the main body 100 and can be formed to have a predetermined side such that a worker can easily clean and manage the inside of the main body 100.

The panel unit 140 is preferably formed into a shape corresponding to a size of the side holes 130 and can be formed to be openable and closable so as to be detachable from the side holes 130.

The main body 100 has a temperature detecting sensor (not illustrated) inside on one side of the main body, the temperature detecting sensor detecting a temperature of the heating unit 400 and the smoking unit 500.

A speed at which the conveyance unit 200 conveys the barbecue unit 300 and a heating temperature of the heating unit 400 can be controlled by a separate controller provided outside based on the temperature detected by the temperature detecting sensor.

Figure 2:
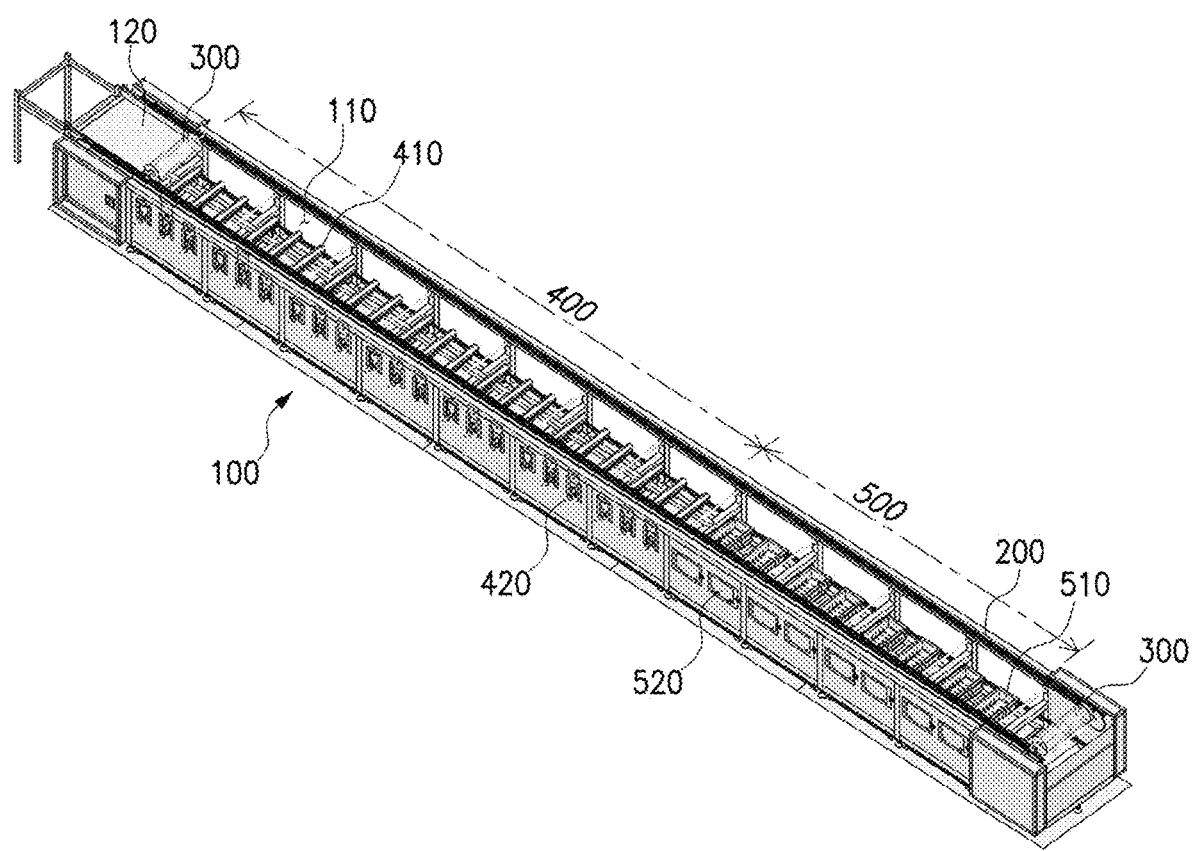
FIG. 2 is a perspective view illustrating the appearance of a conveyance unit according to the embodiment of the present invention.

FIG. 2 is a perspective view illustrating the appearance of the conveyance unit according to the embodiment of the present invention.

With reference to FIG. 2, the conveyance unit 200 includes a plurality of drive members 210 formed at a lower part of the main body 100, a conveyor 220 which is formed at both ends of the opening portion 110 of the main body 100 in the length direction of the main body 100 and loops on an endless track along the shape of the main body 100, and a rack member 230 which is formed in parallel with the conveyor 220 at both ends of the opening portion 110 of the main body 100, and rotates a rotary gear 310 in conjunction with looping of the conveyor 220.

Figure 3:
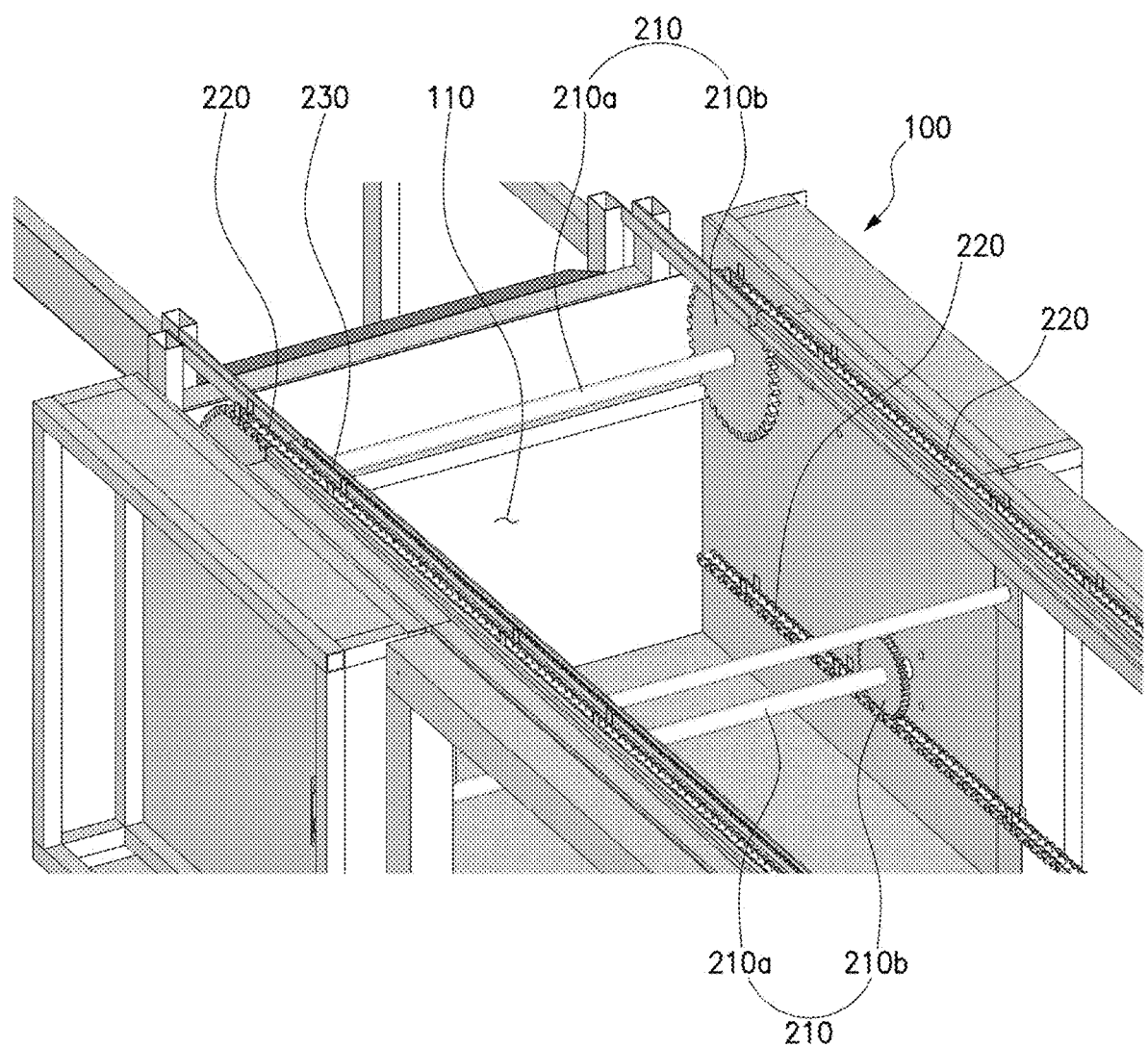
FIG. 3 is a perspective view illustrating a drive member provided at a lower part on one side of a main body according to the embodiment of the present invention.
Figure 4:
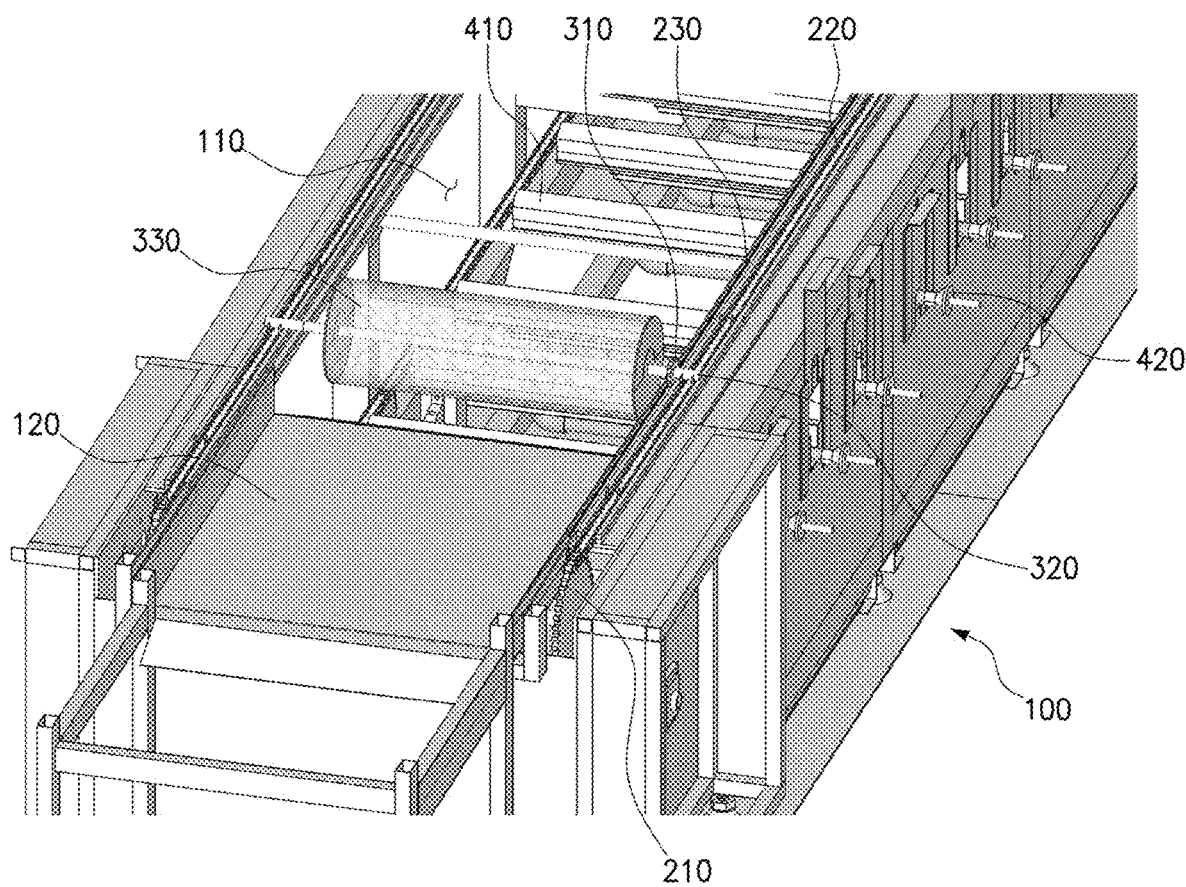
FIG. 4 is a perspective view illustrating a drive member provided at a lower part on the other side of the main body according to the embodiment of the present invention.

FIGS. 3 and 4 are perspective views illustrating drive members provided at the lower part on one side and the lower part on the other side of the main body according to the embodiment of the present invention, respectively.

With reference to FIGS. 3 and 4, a plurality of drive members 210 can be provided at the lower part of the main body 100, and each drive member is configured to have a drive shaft 210a which is rotated by drive of a separate motor provided outside and drive gears 220b which are provided around the drive shaft 210a at both ends of the drive shaft.

The conveyor 220 can be formed into a chain shape forming a looping track along the shape of the main body 100 at both ends of the main body 100.

When the drive shaft 210a is rotated by external power, the drive gears 210b mesh with the conveyor 220 and cause the conveyor 220 to loop.

In other words, when the external power applied to the drive member 210 is adjusted, a speed at which the conveyor 220 loops can be adjusted, and thus a moving speed of the barbecue unit 300 seated on the conveyor 220 can also be adjusted.

A plurality of barbecue units 300 can be provided as necessary to achieve continuous cooking, and specifically includes: the rotary gear 310 which meshes with the rack member 230; a central shaft 320 which is provided as a shaft to the rotary gear 310 and has both ends seated on the conveyor 220; and a barbecue case 330 which is fixed to the central shaft 320 penetrating the barbecue case and contains meat inside.

Consequently, when the conveyor 220 loops, the central shaft 320 seated on the upper end of the conveyor 220 also moves on a straight line together in a looping direction of the conveyor 220, and thus the rotary gears 310 provided around the central shaft 320 are also rotated by meshing with the rack member 230.

Here, a part of the conveyor 220, at which the central shaft 320 is seated, can be formed to correspond to a part of the central shaft 320.

Consequently, when the central shaft 320 is seated on the conveyor 220, both ends of the central shaft are fixed to the conveyor 220, and thus the central shaft maintains a rotating state without being detached from the conveyor 220 while the central shaft 320 moves on the straight line along the conveyor 220.

The barbecue case 330 is fixed to the central shaft 320 penetrating the barbecue case, and thus the central shaft 320 is rotated when the central shaft 320 is rotated.

Here, the barbecue case 330 is preferably formed into a wire-net rotating case.

In addition, the barbecue case 330 can be formed to be divided into upper and lower barbecue cases (not illustrated), and an inside of the barbecue case 330 can be opened by coupling contact parts of the upper and lower barbecue cases to each other by a hinge; however, the barbecue case is not limited thereto, and the barbecue case 330 can be configured to have any shape appropriately selected as necessary as long as the barbecue case can be temporarily opened such that meat can be put inside the barbecue case.

Figure 5:
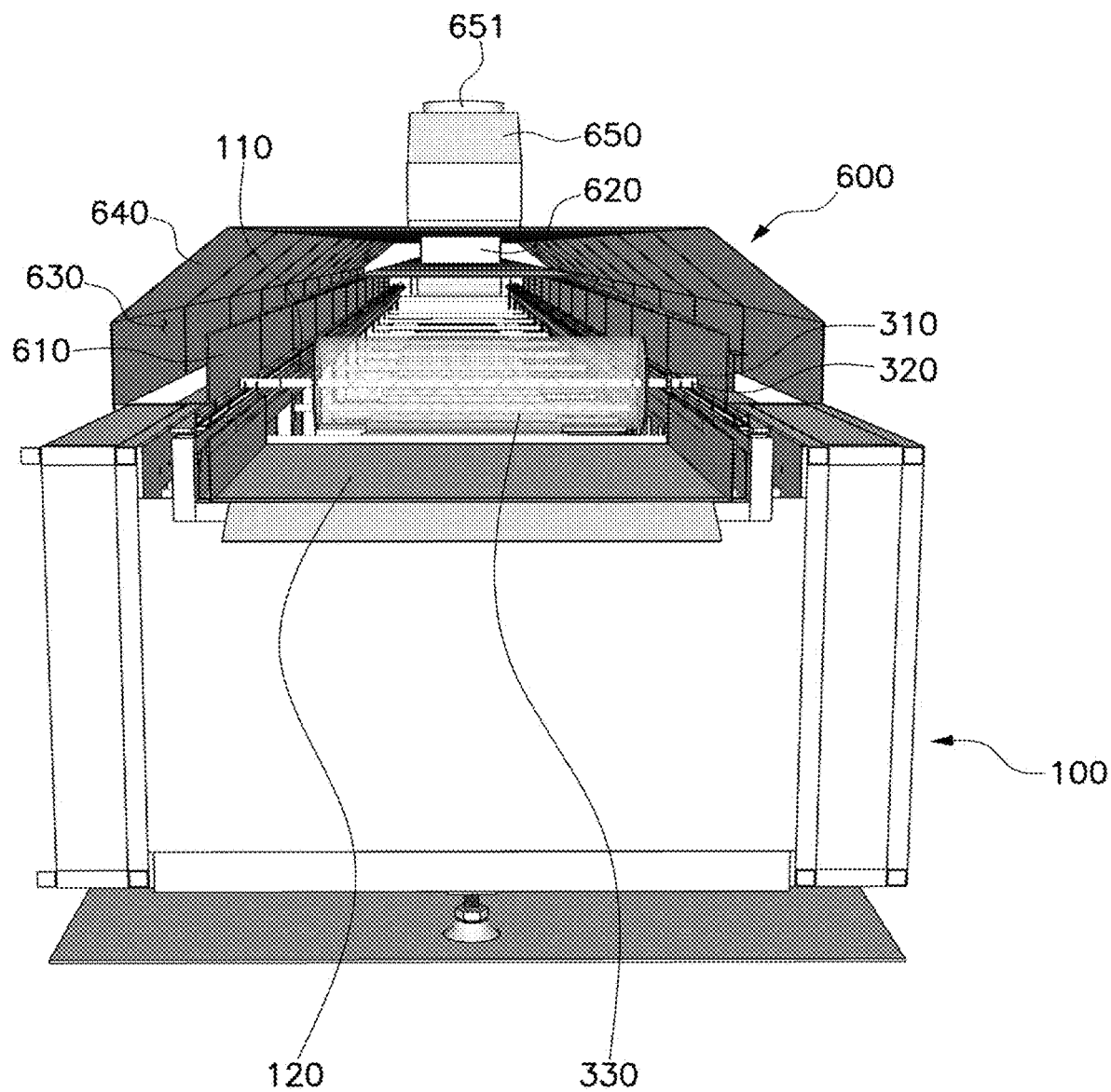
FIG. 5 is a perspective view illustrating the appearance of a heating unit and a brazier unit according to the embodiment of the present invention.
Figure 6:
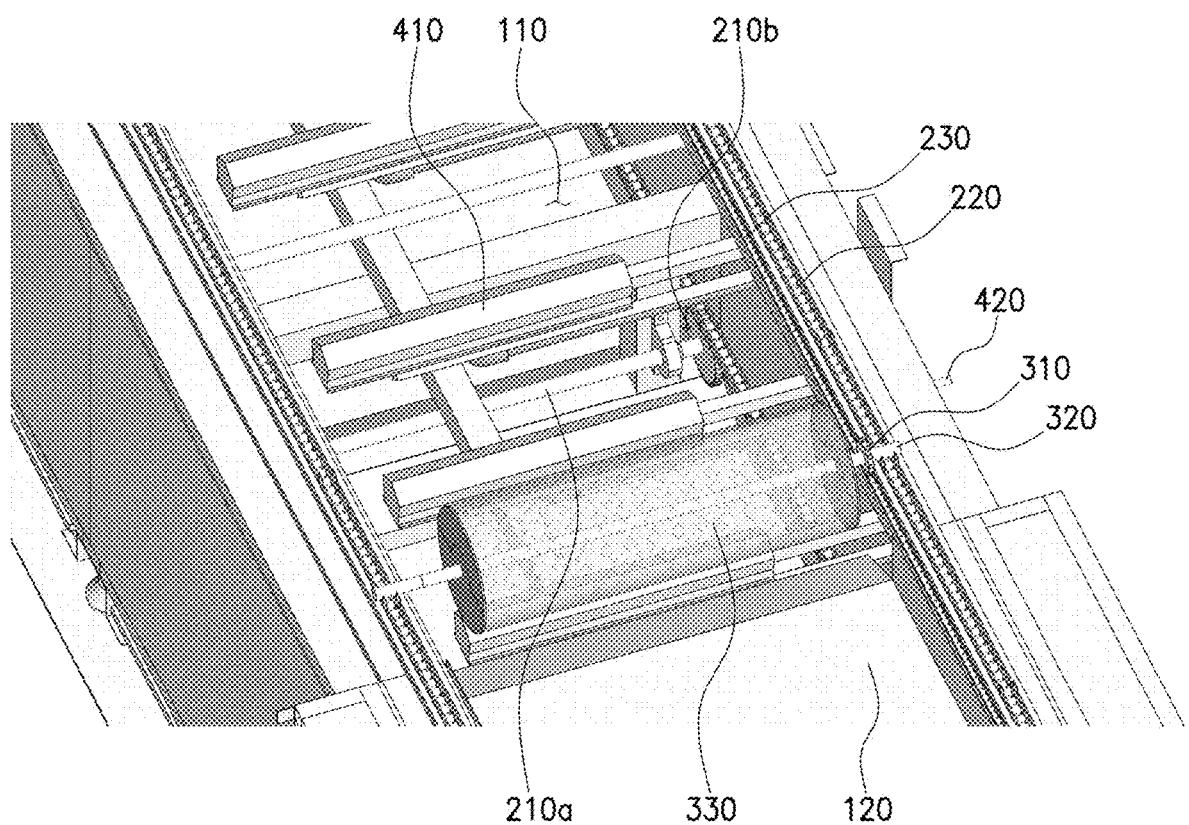
FIG. 6 is a side view illustrating the appearance of the heating unit and the brazier unit according to the embodiment of the present invention.

FIGS. 5 and 6 are a perspective view and a side view illustrating the appearance of the heating unit and the brazier unit according to the embodiment of the present invention, respectively.

With reference to FIGS. 5 and 6, heating units 400 are formed at regular intervals at the lower part on one side of the main body 100 and heat the meat inside the barbecue unit 300 over direct fire through the opening portion 110 of the main body 100.

Specifically, the heating unit 400 is configured to have flame emitters 410 located inside the main body 100 and gas supply members 420 which are formed at a side of the main body 100 and are connected to the flame emitters 410 to supply gas to the flame emitters 410.

Here, the flame emitters 410 can emit flame in a vertical direction and can apply heat to the meat inside the barbecue case 300.

The gas supply members 420 can supply gas to the flame emitters 410 from the outside, and the amount of gas supply can be adjusted based on a temperature detected by the temperature detecting sensor provided inside the main body 100.

In addition, as described above, since the barbecue unit 300 is rotated and moved while being conveyed by the conveyance unit 200, the meat inside the barbecue case 330 is appropriately barbecued by the flame emitters 410.

The smoking units 500 are formed at regular intervals at the lower part on the other side of the main body 100 and smoke and heat the meat by supplying smoke into the barbecue unit 300 through the opening portion 110 of the main body 100, the smoke being produced by burning a smoke material.

Here, the smoking material is charcoal, a briquet, or the like.

The smoking unit 500 is configured to have a box-shaped smoking material containing member 510 positioned inside the main body 100 and a smoking material inserting port 520 formed at a side of the main body 100.

The smoking material inserting port 520 can be formed at the side of the main body 100 at a location corresponding to the smoking material containing member 510 and can be configured to be openable and closable such that a worker located at a side of the main body 100 can manage the smoking material containing member 510 inside the main body 100.

In addition, as described above, since the barbecue unit 300 is rotated and moved while being conveyed by the conveyance unit 200, the meat inside the barbecue case 330 is appropriately smoked by the smoking unit 500.

Figure 7:
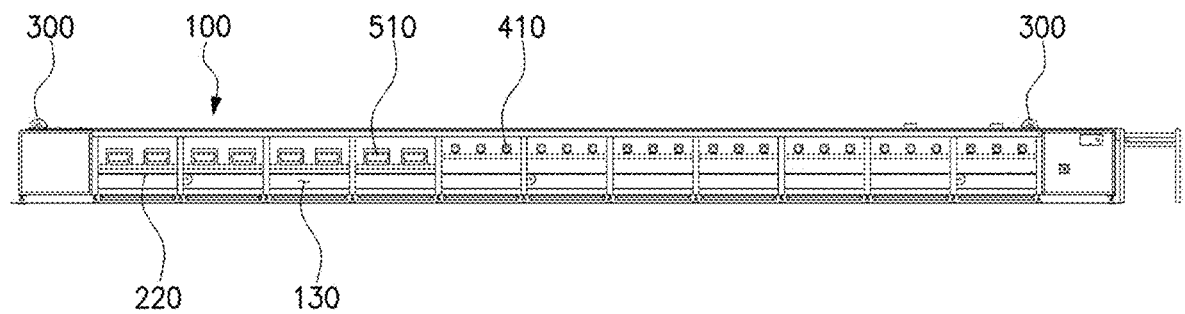
FIG. 7 is a front view illustrating the appearance of an exhaust unit according to the embodiment of the present invention.
Figure 8:
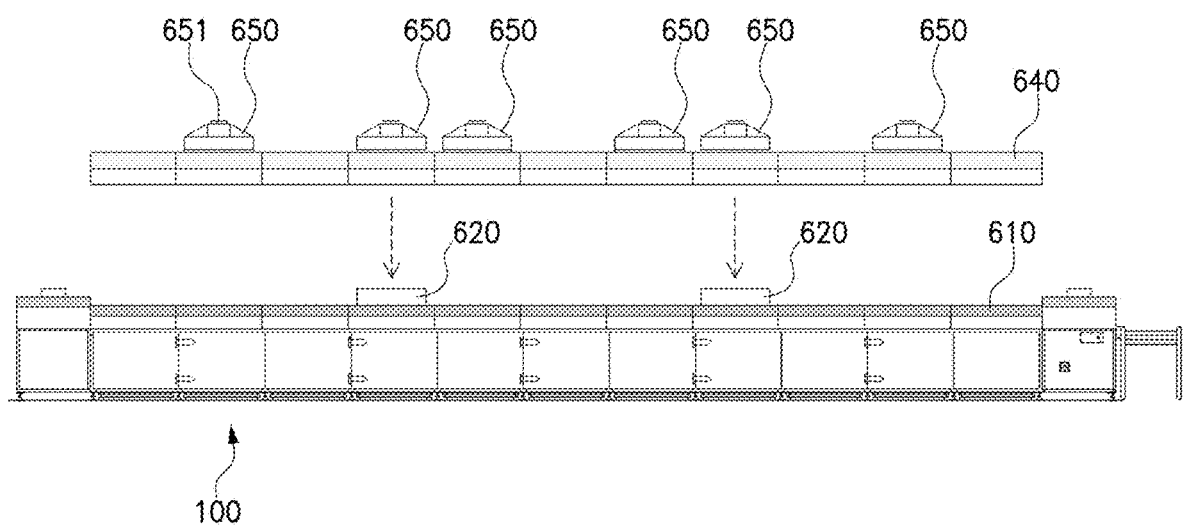
FIG. 8 is a side view illustrating the appearance of the exhaust unit according to the embodiment of the present invention.

FIGS. 7 and 8 are a front view and a side view illustrating the appearance of the exhaust unit according to the embodiment of the present invention, respectively.

With reference to FIGS. 7 and 8, the exhaust unit 600 is provided above the main body 100 and discharges smoke outside and has a first ceiling member 610 which is provided at both upper ends of the main body 100 and forms a space through which the barbecue unit 300 can pass, at least one first exhaust hood 620 which is formed to penetrate the first ceiling member 610 and discharges smoke passing through the opening portion 110 of the main body 100 from the heating units 400 and the smoking units 500 to the outside, a second ceiling member 640 which forms an exhaust passage 630 through which smoke leaking through sides from the inside of the main body 100 passes by being fixed to the first exhaust hood 620 in a state of being separated from the first ceiling member 610 by a predetermined distance, and a plurality of second exhaust hoods 650 which are formed to penetrate the second ceiling member 640 at regular intervals, some of the second exhaust hoods being connected to the first exhaust hood 620 and discharging smoke passing through the first exhaust hood 620 to the outside, and the rest of the second exhaust hoods discharging smoke passing through the exhaust passage 630 to the outside.

The first ceiling member 610 can be provided at the upper end of the main body 100 and is open at front and rear sides thereof to provide a space which the barbecue unit 300 enters, and the first ceiling member can maintain a temperature of the inside of the main body 100 by blocking the upper side of the main body 100 such that heat does not escape to the outside of the main body 100.

The first exhaust hood 620 can have a first exhaust port 621 formed to perpendicularly penetrate the first exhaust hood, and smoke produced in a process of heating and smoking meat in the heating units 400 and the smoking units 500 inside the main body 100 can be discharged through the first exhaust port 621 to the outside.

Smoke leaking through sides of the main body 100 from the heating units 400 and the smoking units 500 can be led to the exhaust passage 630 formed between the first ceiling member 610 and the second ceiling member 640 to be discharged to the outside through a second exhaust port 651 formed at the second exhaust hood 650.

With reference to FIG. 8, at least one first exhaust hood 620 is formed at the first ceiling member 610, a plurality of second exhaust hoods 650 are formed at the second ceiling member 640, and the number of second exhaust hoods is larger than the number of the first exhaust hoods 620, some of the second exhaust hoods being fitted in and fixed to the first exhaust hood 620.

The first and second exhaust hoods 620 and 650 can lead, to the exhaust passage 630, not only the smoke passing through the opening portion 110 of the main body 100 from the heating units 400 and the smoking units 500 but also the smoke leaking through sides of the main body 100, and thus efficient exhaust can be performed.

In other words, when only the first exhaust hood 620 is provided, it is not possible to discharge the smoke leaking through the sides of the main body 100; however, when the second exhaust hoods 650 are provided, the smoke leaking through the sides of the main body 100 from the heating units 400 and the smoking units 500 can be stably discharged.

In addition, a temperature inside the main body 100 can be effectively maintained by preventing a heat loss due to direct exhaust performed when only the first exhaust hood 620 is provided.

As described above, the tunnel-shaped continuous barbecue apparatus according to the embodiment of the present invention is described and illustrated in the drawings; however, the description and the illustration are only provided as examples, and thus those skilled in the art can well understand that the present invention can be variously modified and changed within a range without departing from the technical idea of the present invention.

REFERENCE NUMERALS

100: Main Body
110: Opening Portion
120: Stationary Unit
130: Side Hole
140: Panel Unit
200: Conveyance Unit
210: Drive Member
210a: Drive Shaft
210b: Drive Gear
220: Conveyor
230: Rack Member
300: Barbecue Unit
310: Rotary Gear
320: Central Shaft
330: Barbecue Case
400: Heating Unit
410: Flame Emitter
420: Gas Supply Member
500: Smoking Unit
510: Smoking Material Containing Member
520: Smoking Material Inserting Port
600: Exhaust Unit
610: First Ceiling Member
620: First Exhaust Hood
621: First Exhaust Port
630: Exhaust Passage
640: Second Ceiling Member
650: Second Exhaust Hood
651: Second Exhaust Port.

What is claimed is:

1. A tunnel-shaped continuous barbecue apparatus comprising:
a main body having an opening portion at a center thereof;
a conveyance unit that rotates and moves a barbecue unit, in which meat is put, with external power from one side to the other side of the main body and is formed at both ends of the opening portion of the main body in a length direction of the main body;

heating units that are formed at regular intervals at a lower part on one side of the main body and heat the meat in the barbecue unit over direct fire through the opening portion of the main body;

smoking units that are formed at regular intervals at the lower part on the other side of the main body and smoke and heat the meat by supplying smoke into the barbecue unit through the opening portion of the main body, the smoke being produced by burning a smoke material; and an exhaust unit that is provided above the main body and discharges smoke outside, wherein the exhaust unit has a first ceiling member which is provided at both upper ends of the main body and forms a space through which the barbecue unit can pass, at least one first exhaust hood which is formed to penetrate the first ceiling member and discharges smoke passing through the opening portion of the main body from the heating units and the smoking units to the outside, a second ceiling member which forms an exhaust passage through which smoke leaking through sides of the main body from the heating units and the smoking units passes by being fixed to the first exhaust hood in a state of being separated from the first ceiling member by a predetermined distance, and a plurality of second exhaust hoods which are formed to penetrate the second ceiling member at regular intervals, some of the second exhaust hoods being connected to the first exhaust hood and discharging smoke passing through the first exhaust hood to the outside, and the rest of the second exhaust hoods discharging smoke passing through the exhaust passage to the outside.

2. The tunnel-shaped continuous barbecue apparatus according to claim 1, wherein the conveyance unit includes:

a conveyor which moves the barbecue unit on a straight line by a plurality of drive members formed at the lower part of the main body, is formed at both ends of the opening portion of the main body in the length direction of the main body, and loops on an endless track along a shape of the main body; and a rack member which is formed in parallel with the conveyor, at both ends of the opening portion of the main body, and rotates the barbecue unit in conjunction with looping of the conveyor.

3. The tunnel-shaped continuous barbecue apparatus according to claim 2, wherein the barbecue unit includes:

a rotary gear which meshes with the rack member;

a central shaft which is provided as a shaft to the rotary gear and has both ends seated on the conveyor; and a barbecue case which is fixed to the central shaft penetrating the barbecue case and contains meat inside.

4. The tunnel-shaped continuous barbecue apparatus according to claim 1, wherein the main body includes, at sides, a plurality of side holes formed at regular intervals in the length direction of the main body and a panel unit which is detachable from the side holes.

5. The tunnel-shaped continuous barbecue apparatus according to claim 1, wherein the main body has a temperature detecting sensor inside, the temperature detecting sensor detecting a temperature of the heating unit and the smoking unit, and wherein a speed at which the conveyance unit conveys the barbecue unit and a temperature of the heating unit are adjusted corresponding to the temperature detected by the temperature detecting sensor.

6. The tunnel-shaped continuous barbecue apparatus according to claim 1, wherein the main body has a stationary unit at an end on one side of the main body, the stationary unit providing a place at which the barbecue unit stays before entering the conveyance unit.

* * * * *